Figure 1:
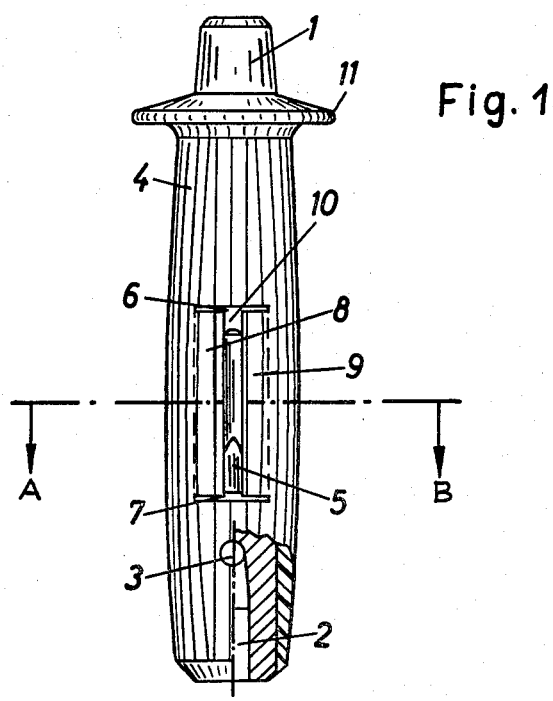
Figure 2:
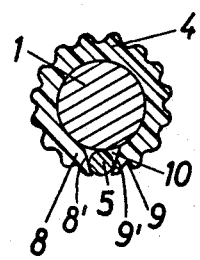

INVENTOR.
ARTUR FISCHER though plastic material such as polyamide, or the like, surrounds the tool body 1 between the annular rim 11 and the lower end thereof and fastened to the outer surface of the cylindrical handle body by resiliently engaging the latter. The sleeve 4 is formed substantially midway between the ends thereof with an elongated cutout 10 extending in the axial direction of the handle from the outer surface of the sleeve 4 to the outer surface of the handle body 1, and the sleeve is also formed with a pair of narrow transverse cutouts 6 and 7 respectively extending at opposite ends of the axially extending cutout 10, to opposite sides of the latter, so as to define with the axially extending cutout 10 a pair of lips 8 and 9 having respectively longitudinal edge faces 8' and 9' directed toward each other. These edge faces are preferably inclined with respect to each other, as can be best seen from FIG. 2, so that the outer edges of these edge faces are spaced nearer from each other than the inner edges thereof. The edge faces 8', 9' define together with the portion of the outer surface of the handle body 1 located between the inner edges of edge faces 8' and 9' a substantially trapezoidal space in which a drift or key 5 is located. The drift 5 has preferably a diameter substantially equal to the thickness of the sleeve 4 and the outer edges of the edge faces 8', 9' are spaced from each other a distance slightly smaller than the diameter of the drift 5, so that the latter may be securely held in the trapezoidal space formed between the edge faces 8', 9', and the portion of the outer surface of the handle body 1 located between the inner edges of the edge faces 8', 9', without protruding with any part beyond the outer surface of the sleeve 4. The drift 5 can be easily removed from the longitudinal cavity 10 with a screw driver or the like, whereby the lips 8 and 9 will be resiliently deflected in outward direction. The lips 8 and 9 form therefore resilient holding means for holding the drift 5 onto the outer surface of the handle body 1. The sleeve 4 with the axially extending cutout 10 and the narrow transverse cutouts 6 and 7 defining between themselves and the axially extending cutout 10 the lips 8 and 9 are preferably molded in one operation. The transverse bore 3 extends, of course, also through the sleeve 4 and portions of the transverse bore 3 in the sleeve may be formed in the same molding operation. The outer surface of the sleeve 4 may be knurled as schematically illustrated in FIG. 2.

It will be understood that each of the elements described above, or two or more together, may also find a useful application in other types of a tool handle for exchangeable tools such as chisels or the like differing from the types described above.

While the invention has been illustrated and described as embodied in a tool handle for exchangeable tools such as chisels or the like and provided with resilient holding means for removably holding a drift onto the handle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A tool retaining means for retaining on a tool handle a drift or the like, said retaining means comprising, in combination, a sleeve of resilient material and having outer and inner substantially cylindrical surfaces of substantially uniform diameter throughout the length of said sleeve so as to be adapted to cover substantially the peripheral surface of the handle, said sleeve being formed intermediate the ends thereof with an elongated cutout extending in the axial direction of said sleeve and radially from the outer toward the inner surface thereof and being in its entirety located between said cylindrical surfaces, said cutout having a pair of oppositely inclined side faces adapted to resiliently engage a drift or the like placed in said cutout to resiliently retain said drift in said cutout, said side faces having outer edges spaced from each other a distance smaller than the inner edges thereof and said cutout having a pair of end faces extending transverse to said side faces and respectively spaced from the ends of the sleeve.

2. A tool retaining means for retaining on a tool handle a drift or the like, said retaining means comprising, in combination, a sleeve of resilient material and having outer and inner substantially cylindrical surfaces of substantially uniform diameter throughout the length of said sleeve so as to be adapted to cover substantially the peripheral surface of the handle, said sleeve being formed intermediate the end thereof with an elongated cutout extending in the axial direction of said sleeve and having a pair of opposite side faces having outer edge portions spaced from each other a distance smaller than the inner edges thereof so as to be adapted to resiliently engage a drift or the like placed in said cutout to resiliently retain said drift in said cutout.

References Cited by the Examiner
UNITED STATES PATENTS

| 264,798 | 9/82 | Tyler. | |
| 707,901 | 8/02 | Cheney | 145—62 |
| 1,317,455 | 9/19 | Perrine | 279—96 |
| 1,353,043 | 9/20 | Hultberg. | |
| 1,647,396 | 11/27 | Decker | 145—62 X |
| 1,852,296 | 4/32 | Gelpcke. | |
| 2,842,260 | 7/58 | Molitor | 206—17 |
| 2,844,244 | 7/58 | Hanson | 206—17 |
| 3,081,481 | 3/63 | Nohl et al. | 150—5 |

FOREIGN PATENTS

| 544,751 | 4/42 | Great Britain. |

WILLIAM FELDMAN, *Primary Examiner.*
MORRIS M. FRITZ, *Examiner.*